US007458758B2

(12) United States Patent
Adams

(10) Patent No.: US 7,458,758 B2
(45) Date of Patent: Dec. 2, 2008

(54) TIE DOWN COUPLING SYSTEM

(75) Inventor: James H. Adams, Tallmadge, OH (US)

(73) Assignee: East Manufacturing Corporation, Randolph, OH (US)

( * ) Notice: Subject to any disclaimer, the term of this patent is extended or adjusted under 35 U.S.C. 154(b) by 0 days.

(21) Appl. No.: 11/650,882

(22) Filed: Jan. 8, 2007

(65) Prior Publication Data

US 2007/0110537 A1    May 17, 2007

Related U.S. Application Data

(62) Division of application No. 09/815,946, filed on Mar. 23, 2001, now Pat. No. 7,160,069.

(60) Provisional application No. 60/191,808, filed on Mar. 24, 2000.

(51) Int. Cl.
*B60P 7/08* (2006.01)
(52) U.S. Cl. .................. 410/104; 410/106; 410/110; 410/116
(58) Field of Classification Search ............ 410/103, 410/104, 106, 110, 116; 24/265 CD; 248/499
See application file for complete search history.

(56) References Cited

U.S. PATENT DOCUMENTS

| 3,018,079 | A | 1/1962 | Stough et al. |
|---|---|---|---|
| 3,070,042 | A | 12/1962 | Dunlap |
| 3,178,790 | A | 4/1965 | Cech |
| 3,294,354 | A | 12/1966 | Batey |
| 3,353,780 | A | 11/1967 | Young |
| 3,685,778 | A | 8/1972 | Berns |
| 3,850,113 | A | 11/1974 | Sichak |
| 3,917,338 | A | 11/1975 | Becker |
| 4,226,465 | A | 10/1980 | McCullough |
| 4,248,558 | A | 2/1981 | Lechner |
| 4,293,255 | A | 10/1981 | Hrasche |
| 4,340,329 | A | 7/1982 | Ericsson |
| 4,367,993 | A | 1/1983 | Meigs |
| 4,484,847 | A | 11/1984 | Holmes |
| 4,818,162 | A | 4/1989 | Zukowski et al. |
| 4,951,365 | A | 8/1990 | Loyd |
| 5,388,938 | A | 2/1995 | Helton |
| 5,516,246 | A | 5/1996 | Helton |
| 5,533,848 | A | 7/1996 | Davis |

(Continued)

OTHER PUBLICATIONS

Kinedyne Corporation's Catalog CC300 titled *Cargo Control Systems*, published 2000.

*Primary Examiner*—Stephen Gordon
(74) *Attorney, Agent, or Firm*—Fay Sharpe LLP

(57) ABSTRACT

A hook hanger for a cargo trailer includes a body. The body includes: (i) a mounting bracket conforming in shape to and slidably engageable with an associated sliding track of an associated cargo trailer; (ii) a hook anchor connected to the mounting bracket; and, (iii) a wall that cooperates with the hook anchor to define a channel including an opening in a side of the body. The wall limits vertical movement of a hook connected to the hook anchor to prevent inadvertent disengagement by vertical movement. The hook is disengageable from the hook anchor only by sliding movement transverse to vertical and through the channel opening. The channel opening is selectively blocked by a movable leg member connected to the body.

5 Claims, 7 Drawing Sheets

U.S. PATENT DOCUMENTS

| | | |
|---|---|---|
| 5,674,033 A | 10/1997 | Ruegg |
| 5,807,045 A | 9/1998 | Profit |
| 5,853,164 A | 12/1998 | Hunt |
| 5,860,777 A | 1/1999 | Walsh et al. |
| 6,168,360 B1 | 1/2001 | Knox |
| 6,250,861 B1 | 6/2001 | Whitehead |
| 7,160,069 B2 * | 1/2007 | Adams ................ 410/104 |

* cited by examiner

TIE DOWN COUPLING SYSTEM

CROSS-REFERENCE TO RELATED APPLICATION

This application is a divisional of U.S. application Ser. No. 09/815,946 filed Mar. 23, 2001, U.S. Pat. No. 7,160,069, which claims priority from and benefit of the filing date of U.S. provisional application Ser. No. 60/191,808 filed Mar. 24, 2000, and both of said prior applications are hereby expressly incorporated by reference into the present specification.

FIELD OF THE INVENTION

The present invention relates generally to an improved tie down coupling system for facilitating securing of cargo for transportation. More particularly, the invention relates to a coupling hanger system to provide an adjustable, locking tie down system.

BACKGROUND OF THE INVENTION

Cargo of various types is transported by a variety of means, including trailers, such as flat bed trailers, which are designed to transport various loads positioned on the trailer bed along its length, or at discrete locations thereon. Other vehicles, such as airplanes or trains, are also used to transport cargo. In many cases, the loads carried by such trailers or other vehicles may be bulky and irregular in shape and/or weight distribution, adversely effecting stability of the load on the trailer. In order to safely transport cargo in such environments, the cargo must be secured against any movement or shifting, and cargo control systems have been developed for this purpose. Such cargo control systems have included retaining straps fixed on one side of a trailer bed and having retaining hooks on a free end which are secured to the other side of the trailer bed over a portion of a load positioned on the trailer bed. The retaining straps may include a ratchet type assembly positioned along its length for tightening down of the strap onto a load. The strap may also be anchored at its one end via a winch assembly for tightening of the strap. Over center buckles are also commonly employed with tensioning straps for cargo tie-down systems to secure cargo on a trailer bed or floor. In the past, the tie down straps may have been situated at discrete intervals along the length of the trailer bed, but were fixed in position, and thus presented problems with properly securing certain loads, depending upon the shape and size of the cargo. More recently, the cargo retaining straps are adjustably positioned by means of movable winches mounted upon elongated tracks fixed to a vehicle bed, floor or vehicle wall. The winches are movable, allowing the tension forces within the cargo-retaining strap to be substantially perpendicular to the axis of the winch track. Different vehicle mounted tracks for use with load bearing winches have been developed, and include a double L track design as well as a C track design as examples.

Although adjustable winch position facilitates properly tightening cargo retaining straps about a load positioned on a vehicle or like, various problems continue to exist with respect to cargo tie down systems. As in the case of flat bed trailers, the typical method to secure freight or cargo on a flatbed trailer would require moving the cargo tie down strap winch to a desired location, and unrolling the cargo tie down strap, such as a dacron web, against the cargo positioned on the deck of the flatbed trailer. The web is first placed over the cargo with enough extra length to ensure properly engaging the opposing side of the trailer. If the web includes a hook, the hook is temporarily engaged upon a portion of the trailer on the opposing side of the cargo, and then the user must return back to the winch for tightening of the web to a required tension to secure the freight. Typically, a winch bar may be used in the winch to gain leverage needed to tension the web. In many instances, if the retaining strap includes a hook, the hook will not remain in engagement with the trailer due to its loosened condition, such that upon tightening, the strap is not properly engaged to the opposing side of the trailer over the cargo. As a large number of cargo retaining straps may be used, the inability to effectively secure the distal end of the strap to the trailer in a desired manner over a cargo becomes a significant problem. Further, hooks that are sometimes provided on cargo retaining straps may not provide proper coupling to a portion of the vehicle in a desired manner to properly secure cargo. As an example, hooks typically provided on retaining straps include flat hooks, grab hooks and chain anchors wherein a length of chain is terminated with a grab hook, or a loop or ring is provided as a coupling member associated with the strap. The hook type coupling members are generally susceptible to movement in association with a portion of the vehicle to which they are attached, presenting the possibility of untensioning of the strap which could allow shifting or movement of the cargo. Other types of coupling members or arrangements typically require the user to physically tie or secure the end of the strap to a portion of the vehicle, increasing the labor involved in properly securing a load.

Based upon the foregoing, it would be advantageous to provide a tie down hanger system for cargo handling systems which allow positive retention of a tie-down restraining strap in a manner to facilitate properly securing a load. It would further be advantageous to provide a tie down straphanger system for securing tie down straps at an adjustable position depending upon the nature and position of cargo. It would also be desirable to provide a tie down coupling system, which works in conjunction with adjustable winch and track combinations, and to provide a tie down strap coupling system, which eliminates the possible untensioning of the tie down strap.

SUMMARY OF THE INVENTION

Based upon the foregoing, it is an object of the present invention to overcome the deficiencies noted in the prior art by providing a tie down hanger system for use with cargo retaining straps or members, which facilitates proper securement of a load. The tie down coupling system according to the invention allows positive retention of the free end of a retaining strap having a coupling member associated therewith. The tie down hanger system comprises a slideable bracket member having a track-engaging portion, which is selectively engaged in mating relationship with a bracket track member. The bracket further comprises an anchor system formed in association with the bracket for positive retention of a coupling member associated with the cargo-restraining device. The tie down hanger system according to the invention is selectively positionable in association with the track in a desired location with respect to cargo to be secured, and the system prevents substantial vertical or horizontal movement of the restraining strap coupling member which would result in untensioning of the strap or other restraining device.

These and other objects and advantages of the invention will become apparent upon a reading of the following description in conjunction with the drawings.

DETAILED DESCRIPTION OF THE INVENTION

Figure 1:
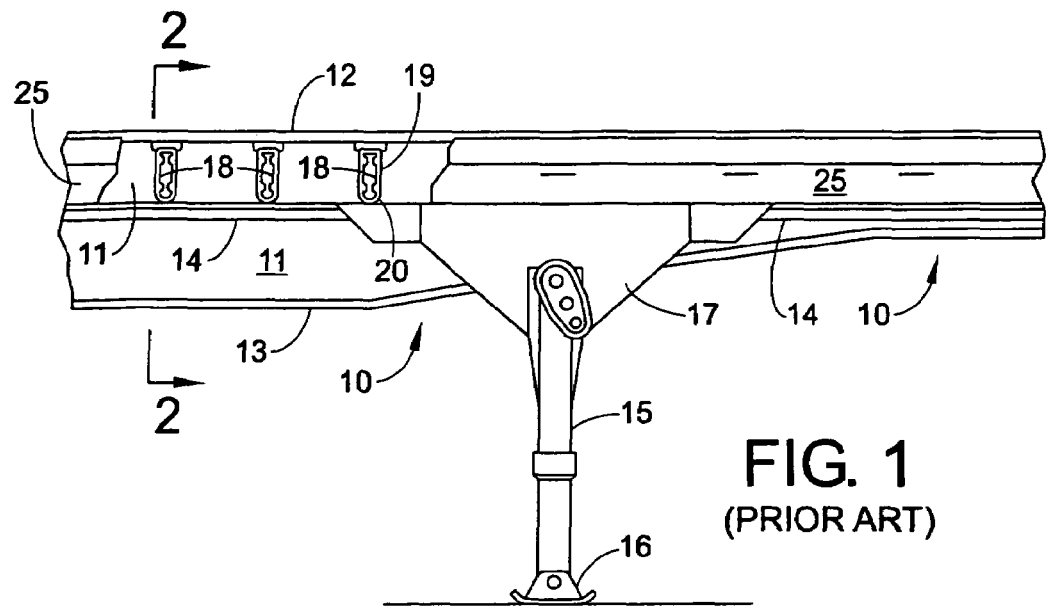
FIG. 1 is a partial side elevational view of a typical flatbed trailer, representing the type of vehicle with which the present invention may be utilized.

By referring to the drawings and.FIG. 1 in particular, it will be seen that a known flat bed trailer structure is disclosed which is preferably formed of aluminum extruded and fabricated sections. The portion of the flat bed trailer seen in FIG. 1 comprises a portion inwardly of the front end thereof. The trailer structure is formed of a pair of longitudinally disposed I-beams 10 comprising web portions 11 with upper and lower horizontally disposed flanges or chords 12 and 13 respectively. The I-beams 10 are each formed of a pair of T-shaped extrusions welded to one another longitudinally on a weld line 14. The forward portion of the flat bed trailer has the I-beams of reduced height by forming one of the web portions 11 in a tape red shape below the weld line 14. A retractable double leg support 15 having pivoted ground engaging shoes 16 is attached to the forward portion of the fiat bed trailer by semi-triangular mounting brackets 17 which are secured to several of a plurality of transversely positioned tubular frame members 18 which are located in longitudinally spaced transversely registering apertures 19 in the upper portions of the webs 11 of the longitudinally extending I-beams 10 as illustrated in FIGS. 1 and 2 of the drawings.

By referring to FIG. 1 of the drawings, it will be seen that three of the tubular frame members 18 are shown double welded in three of the apertures 19, a portion of an outside rail 25 being broken away. Each of the tubular frame members 18 are double welded in position in each of the pairs of transversely registering apertures 19 formed in the upper portions of the webs 11 of the I-beams 10. Each of the opposite spaced vertical side walls of the tubular frame member 18 are welded by fillet welds to the portions of the I-beam web 11 defining the vertical walls of the aperture 19 therein so as to result in double welds joining the side walls of the tubular frame members 18 to the I-beams 10. The lower portion of the aperture 19 is cross sectionally curved in a half circular shape matching that of the bottom portion 20 of the tubular frame members 18 which fit snugly therein.

Figure 2:
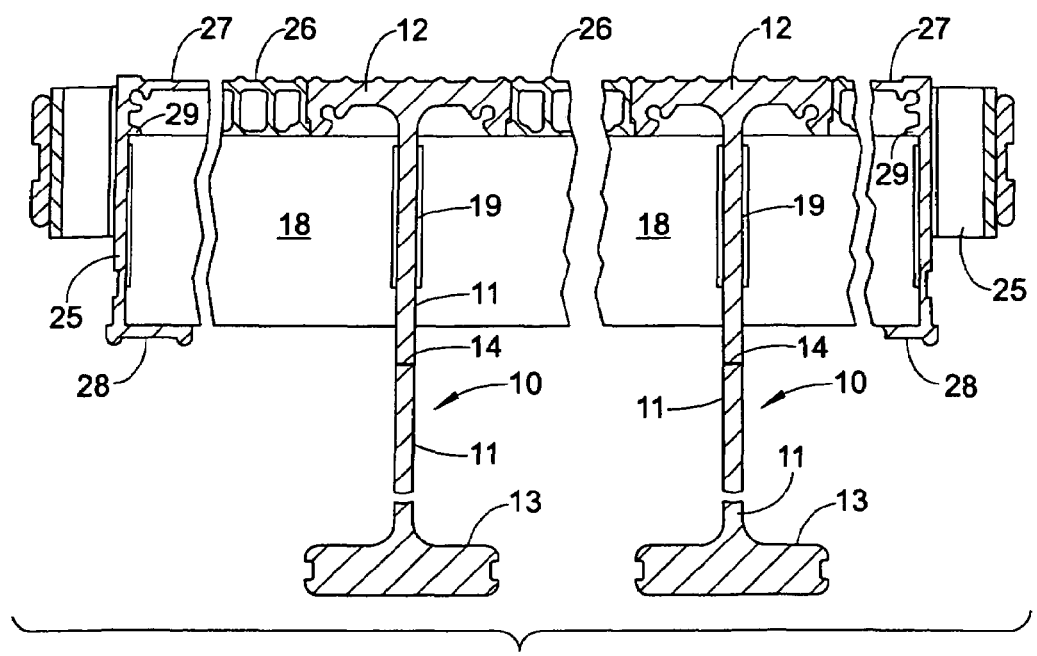
FIG. 2 is a partial cross-section of the bed portion associated with the trailer as shown in FIG. 1, being representative of a type of flatbed construction known in the art.

By referring now to FIG. 2 of the drawings, a transverse section, on an enlarged scale, through the flat bed trailer may be seen and by referring thereto one of the transversely positioned tubular frame members 18 will be seen double welded in the apertures 19 in the webs 11 of the I-beams 10. It will also be seen that the upper transversely disposed portions 12 of the I-beams 10 form a portion of the floor of the flat bed trailer. Several longitudinal extending compartmented hollow flooring sections 26 are positioned longitudinally of the flat bed trailer in abutting parallel relation with the upper transversely disposed portions 12 of the I-beams 10. The flooring sections 26 are welded to each of the transversely positioned tubular frame members 18 which support the same.

The outside rail 25 has vertically spaced inwardly extending right angular sections 27 and 28 on its upper and lower edges and an in-turned flange 29 spaced with respect to the upper flange 27. The ends of each of the transversely positioned tubular frame members 18 abut the inner surface of the outside rails 25 and are welded thereto and the in-turned longitudinally extending rib 29 rests on the upper straight top portion of each of the transversely positioned tubular frame members 18 and thereby spaces the in-turned flange 27 thereabove on the same level as the upper surfaces of the flooring sections 26 and the upper surfaces of the transversely disposed portions 12 of the I-beams 10.

The known flat bed trailer structure disclosed herein is formed of aluminum extrusions welded to one another in the finished flat bed trailer assembly and the spaced longitudinally extending I-beams 10 are fabricated from two such aluminum extrusions, each of which is T-shaped and which extrusions are arranged with one upright and one inverted and joined together by welding them continuously to one another on the weld line 14 hereinbefore referred to. The assembly of the I-beams from the two T-shaped aluminum extrusion enables the plurality of apertures 19 in each of the web portions 11 of the I-beams 10 to be stamped therein with a controlled size and configuration which insures the accurate and desirable positioning of the transversely positioned tubular frame members 18 where they may be easily and efficiently double welded and serve not only to cross brace the I-beams 10, but provide continuous side to side supporting structure for the flooring of the flat bed trailer structure.

Figure 3:
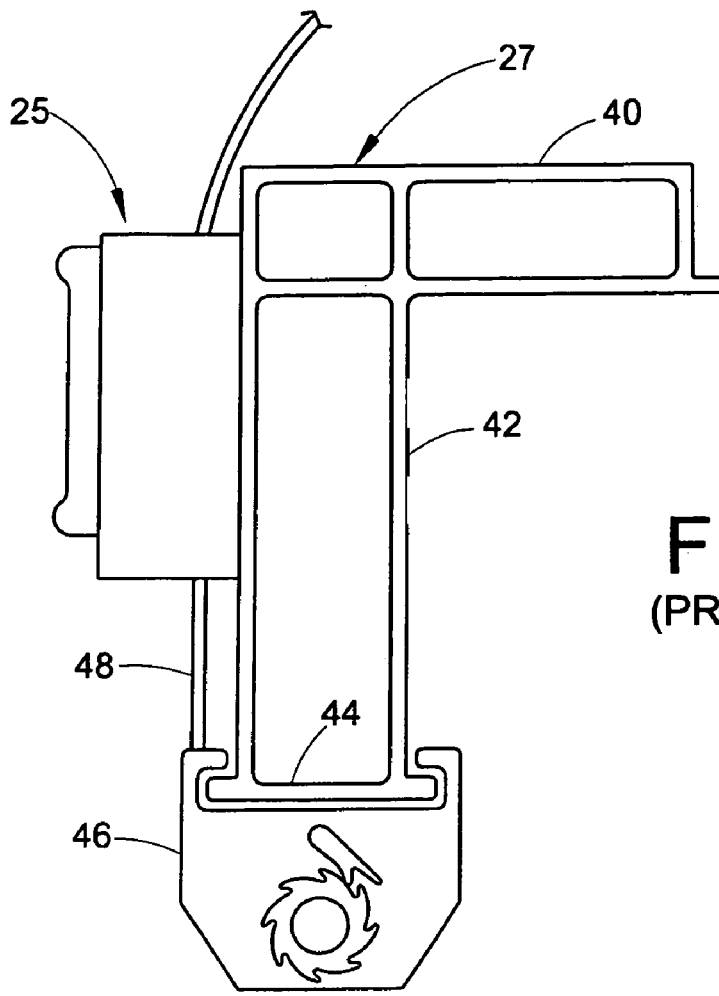
FIG. 3 is a partial sectional view showing a portion of the trailer floor, rub rail and associated winch track and sliding webbing winch used therewith.
Figure 4:
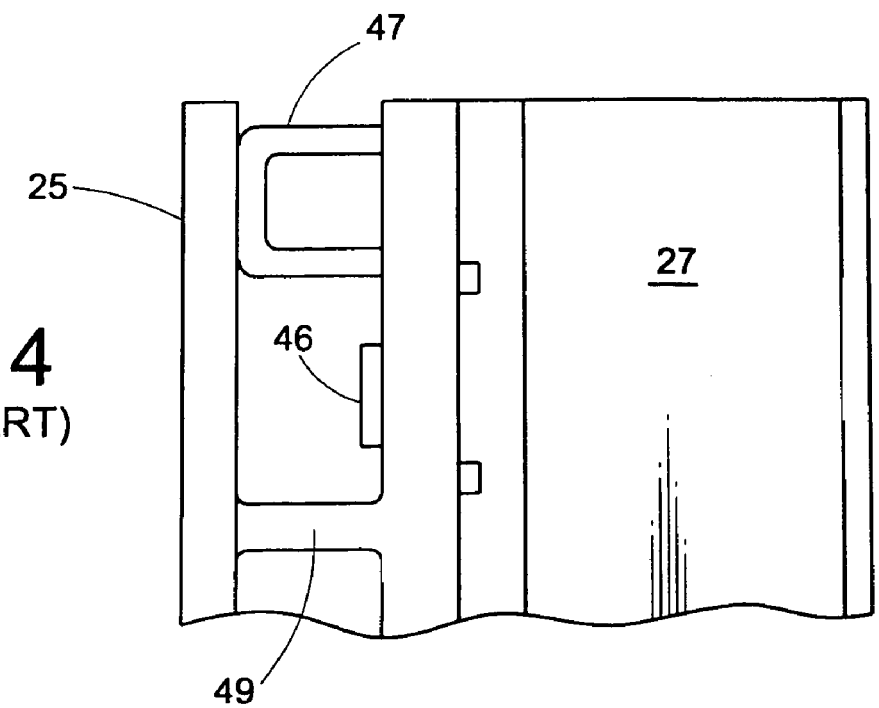
FIG. 4 is a top view of a portion of the flatbed trailer as shown in FIG. 3.

Referring to FIG. 3, a portion of the flatbed trailer relating to a portion of the trailer bed outboard of the I-beams, comprising the rub rails 25 secured to an outside flooring section 27. The flooring section 27 includes an upper surface 40 comprising a portion of the surface used to support cargo on the trailer. There may also be provided a downwardly extending wall portion 42 having a flange 44 at its outer end. The flange 44 provides a mounting rail for a sliding winch assembly 46. As shown in FIG. 3, the formation of a mounting track by means of downwardly extending wall section 42 and flange 44 may be integrally formed as part of the trailer assembly, or could be mounted to the trailer as an add on feature. It should also be recognized that although it may be desirable to provide sliding webbing winches on associated tracks such as shown in FIG. 3, the tie down system according to the invention does not require such usage. The tie down assemblies according to the invention may also be used with welded on webbing winches or other cargo control systems as previously mentioned. Provided in association with winch 46 is a strap or webbing 48 which is selectively unwound from the winch 46 for tying down cargo mounted on the upper surface of the trailer bed. As seen in FIG. 4, the rub rail 25 is positioned in spaced apart relation to the trailer bed indicated by flooring section 27, by means of mounting assemblies 47 and 49. The winch 46 is positioned to extend strap 48 through the opening between rub rail 25 and flooring section 27, so the strap is protected from contact by means of rub rail 25. A load is secured on the trailer by applying tension to the strap or webbing 48 once the strap is positioned across cargo and attached to the other side of the trailer. As previously mentioned, the attachment of the tie down strap to the other side of the trailer has been attempted by use of a variety of different hooks, chains or simply tying the strap to some structure of the trailer. The present invention is directed at a tie down assembly for use in properly securing cargo in association with a trailer assembly such as shown, or in other similar environments, where cargo is desirably prevented from shifting or movement during transportation.

Figure 5:
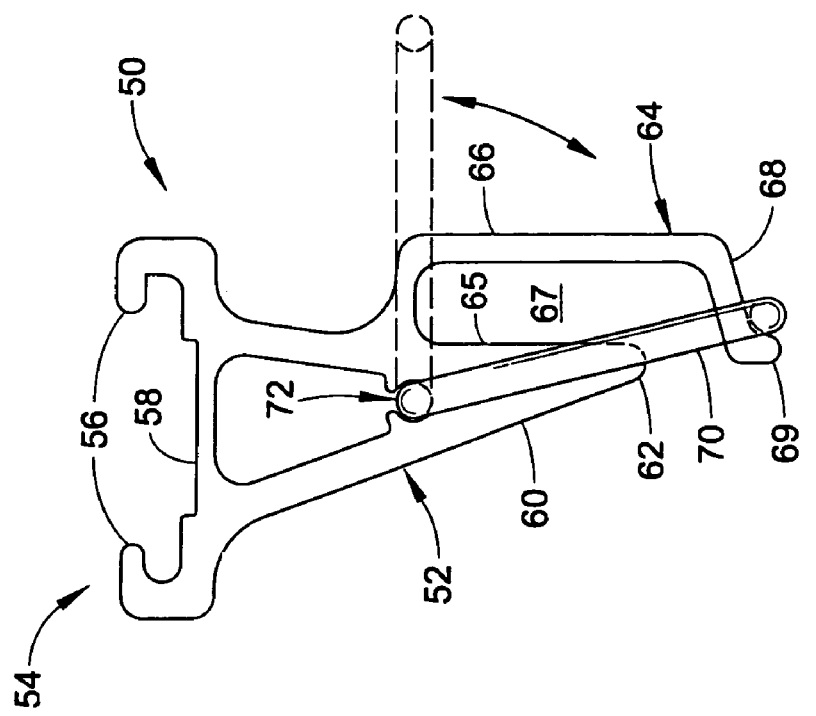
FIG. 5 is a side elevational view of a first embodiment of the tie down system according to the invention.
Figure 6:
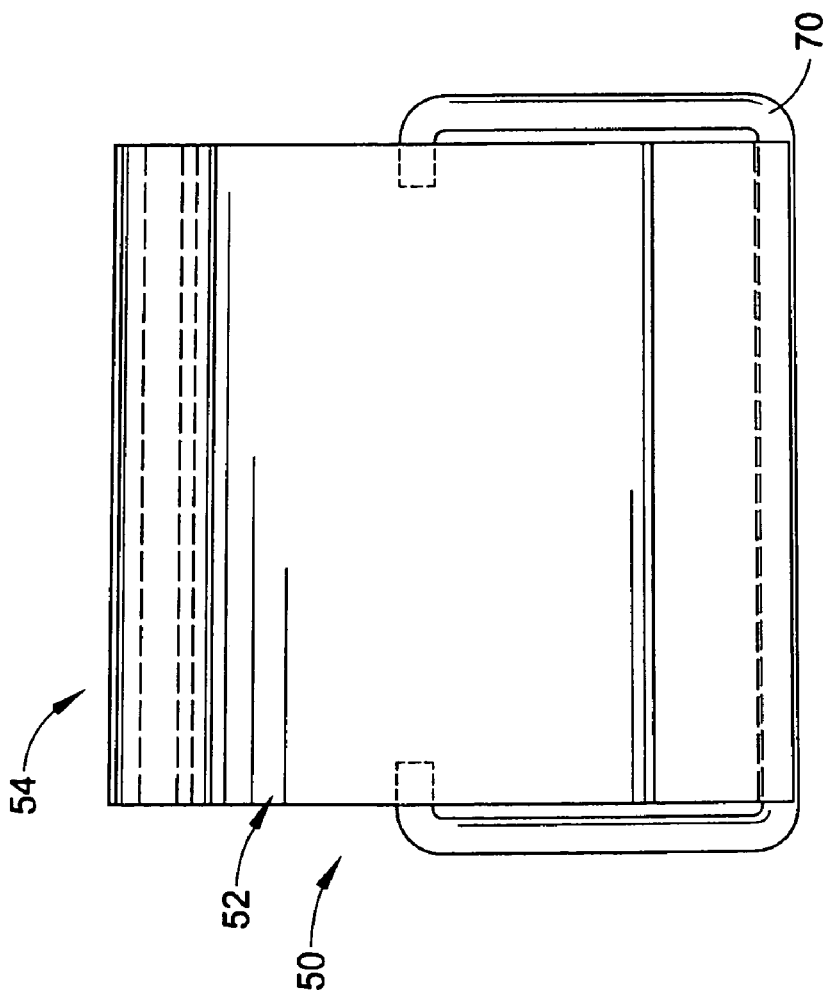
FIG. 6 is a front elevational view of the assembly as shown in FIG. 5.
Figure 7:
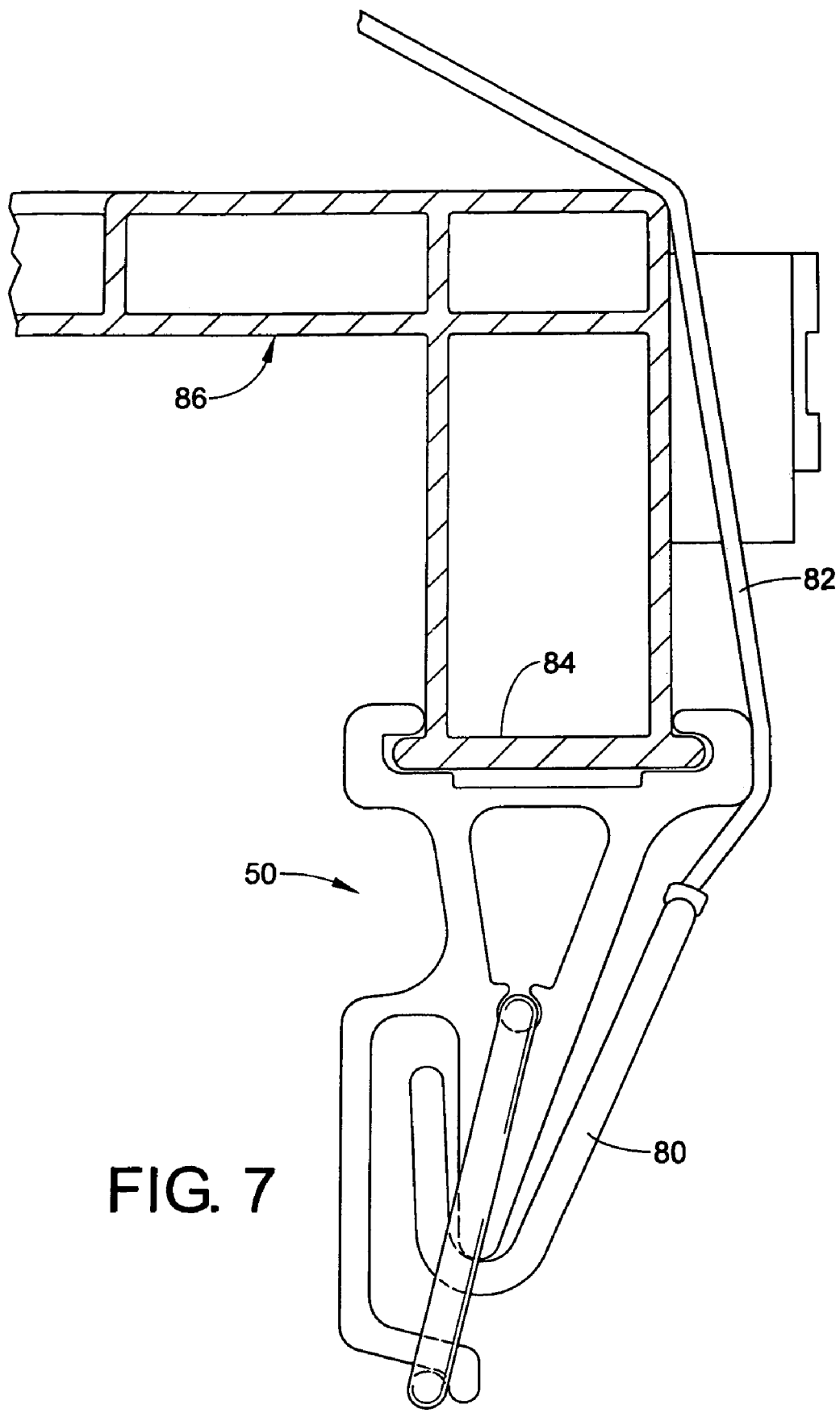
FIG. 7 is a side view of the assembly as shown in FIG. 5 mounted in association with the portion of a flatbed trailer.

Turning now to FIGS. 5-6, a first embodiment of the tie down coupling system 50 according to the invention is shown. As seen in FIG. 7, the assembly 50 is shown as a hook hanger for engagement of a flat hook 80 type of retaining member positioned on the terminal end of a cargo restraining strap 82 or the like. Hook hanger 50 is slideably attachable to winch rail 84 or other suitable track or mounting structure. The mounting rail or track 84 may be similar to winch tracks used for sliding webbing winches, and may be integrated into a portion of the trailer body 86 or a separate member selectively attached such as by welding to the trailer or other vehicle. The hanger system 50 comprises a body 52 having a mounting bracket 54 having a cross sectional profile conforming to winch rail 84. In the embodiment shown in FIGS. 5 and 6, the bracket 54 has a profile conforming to the I-beam type of mounting track 84 in substantially the shape of a "C" and has engaging arms 56 which mount to the track 84 as seen in FIG. 7. Once mounted on the track 84, the system 50 is thus slideable along the track 84 to any desired position along the length of track 84, depending upon the particular application. To facilitate movement of the body 52 along the length of the track 84, a cutout portion 58 may be provided in the C-shaped channel, to resist binding when the body 52 is repositioned.

Below the mounting bracket 54, the body 52 comprises a hook hanger 60 further may comprise a hook anchor 62. The hook hanger 60 is formed into the body 52, such as by extrusion manufacturing processes, or the hanger 60 could be made to attach to the body 52. A separable hanger may allow a different retaining fixture to be mounted to body 52 for other types of devices used on the terminal end of the retaining strap or member, making the system adaptable to various types of cargo control systems. In the embodiment shown in FIGS. 5 and 6, hook anchor 62 is generally a wedge-shaped member capable of anchoring hook 80 as seen in FIG. 7. It should be noted that due to the construction of the system 50, it can be properly mounted on either side of the cargo carrying space in conjunction with tracks 84 provided on each side. Generally, when said slideable bracket 54 is mounted on rail 84 and positioned to secure a load on a trailer bed 86 or the like, a hook 80 may be engaged on hook anchor 62 without the hook 80 thereafter being subject to inadvertent disengagement from the hook anchor section of body 50. This allows the tie down member to be more easily positioned and thereafter tensioned to secure a load (not shown).

Of concern when using tie down members to secure cargo is the possibility that the tie down member may shift or otherwise move, which could result in loosening of the tie downs and unsafe transportation conditions. As previously mentioned, the present invention also facilitates properly securing a load by positively engaging the hook or other coupling member, either under tension or when not tensioned. When the tie down member is not tensioned, the hook hanger 60 works to retain the hook 80, so the user can easily then tension the tie down member without hook becoming disengaged in the tensioning process. Further, during operation when the trailer or other vehicle is moving, it is desirable to prevent hook 80 from fully disengaging from hook hanger 60, for example, to prevent shifting of the hook 80 or to prevent hook 80 from flying off and becoming a safety hazard. As shown in FIG. 5, hook hanger 60 may further comprise a hook retainer assembly 64 to prevent hook 80 from fully disengaging from hook hanger 60. In this embodiment, the hook retainer assembly 64 may comprise a wall 66, which is spaced apart from the inside wall 65 of hook hanger 60. A bottom wall 68 extends toward the hook hanger 60 to form an opening 67 with respect to hook anchor 62. As should be recognized, the hook 80 when positioned in engagement with the hook hanger 60 as shown in FIG. 7, will only have limited vertical movement within space 67 before engaging the bottom wall 68 of retainer assembly 64. The hook 80 is therefore positively engaged with the hook hanger by sliding the hook into the engagement position as shown in FIG. 7 from the side of body member 52, and once in this position, cannot disengage by vertical movement of the hook 80. Thus, when tie down strap 82 is untensioned, the hook 80 can be positively engaged in the hook hanger to facilitate tensioning thereafter.

Figure 5A:
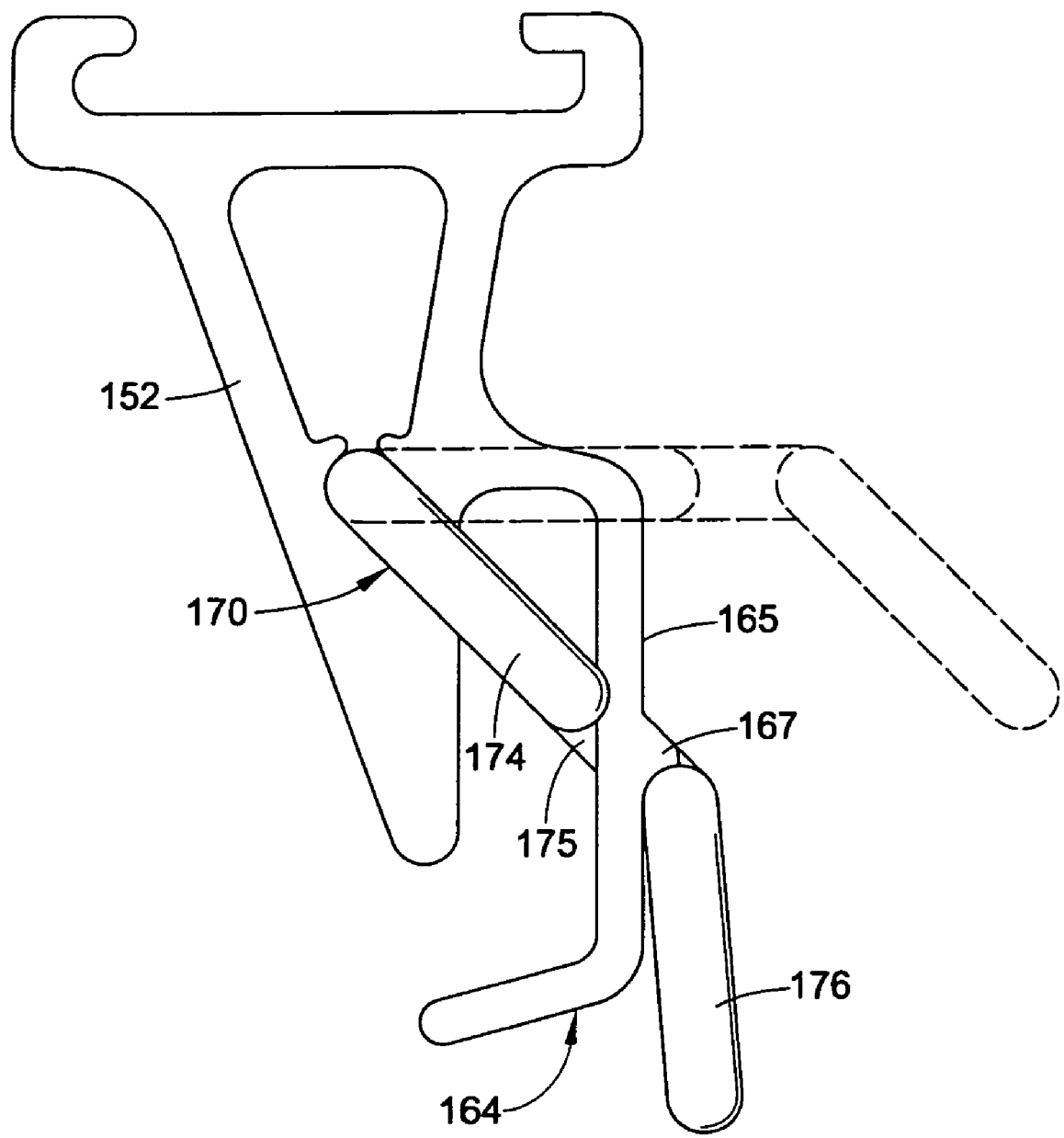
FIG. 5A is a side elevational view of an alternate embodiment of the tie down system according to the invention.

It is also desirable to prevent horizontal movement of the hook from its proper engagement with the body member 50. A retaining bar 70 is configured for pivotable movement with respect to a mounting position 72. In a locking position as shown in solid in FIG. 5, the retaining bar 70 extends across the opening 67 on opposing sides of body 52. In this position, a hook 80 positioned in the opening 67 will be positively retained in space 67, regardless of the tension applied to the strap 82 or hook 80. The retaining bar 70 is then easily pivoted to a disengaging position as seen in ghost in FIG. 5, for insertion or removal of the hook 80 from space 67. The bottom wall 68 of the hook retainer assembly 64 may have a stop 69 to position retaining bar 70 in the locking position as shown in FIG. 5. An alternative embodiment of the hook retaining features of the invention is shown in FIG. 5A, wherein a similar body member 152 includes a similar vertical hook retaining structure and an alternative horizontal hook retainer bar 170. The horizontal-movement retainer 170 comprises first and second retainer leg members 174 and 176, and a connecting portion 175. First and second retainer leg members 174 and 176 form a notch in conjunction with the connecting portion 175 which engages the wall 165 of the retainer assembly 164 and a stop or boss 167 formed on the back side thereof. The arm 174 is thus positioned to prevent substantial horizontal movement of hook 80 relative to body 152 and to positively engage the hook similarly to the embodiment of FIG. 5. Retainer leg members 174 and 176 are then pivotable upward to the position as shown in ghost to allow manual insertion and removal of the hook in a manner similar to the prior embodiment. Horizontal-movement retainer 170 is thereby rotatable between open and closed positions. In the closed position, horizontal-movement retainer 170 may be locked in position. In the embodiment shown, arm 176 abuts locking ridge 167. When horizontal-movement retainer 170 is in the closed position, the arm 176 is snap fit against locking ridge 167, thereby locking horizontal-movement retainer in place. Locking arm 176 also serves as a handle to assist in manual movement of horizontal-movement retainer 170 between the open and closed positions.

Figure 8:
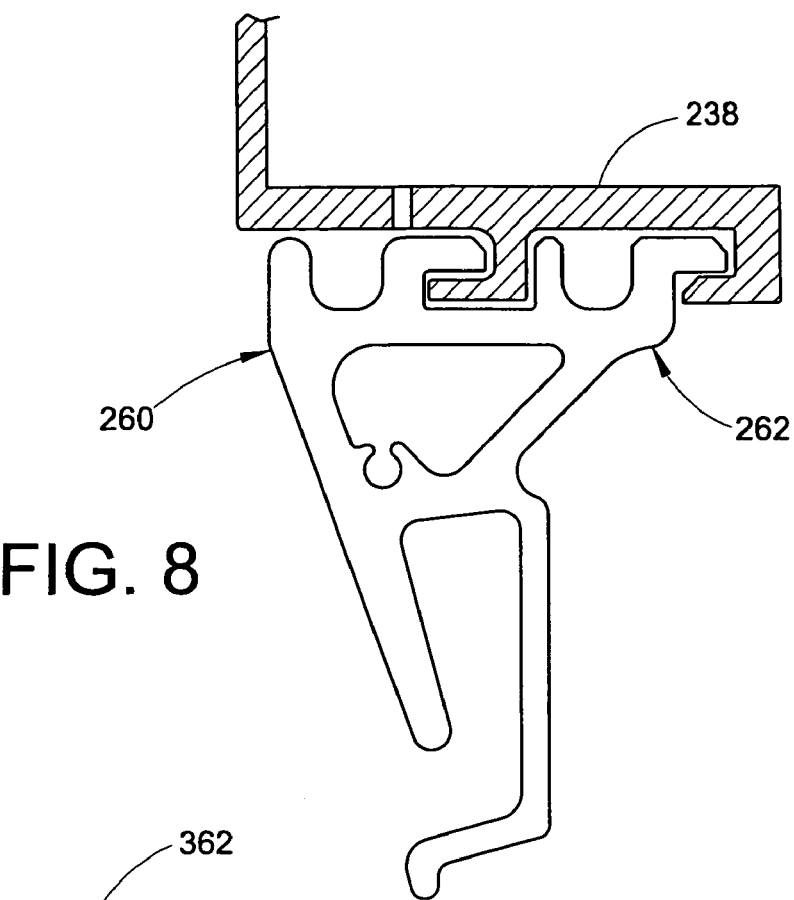
FIG. 8 is a alternate embodiment of the tie down system according to the invention.
Figure 9:
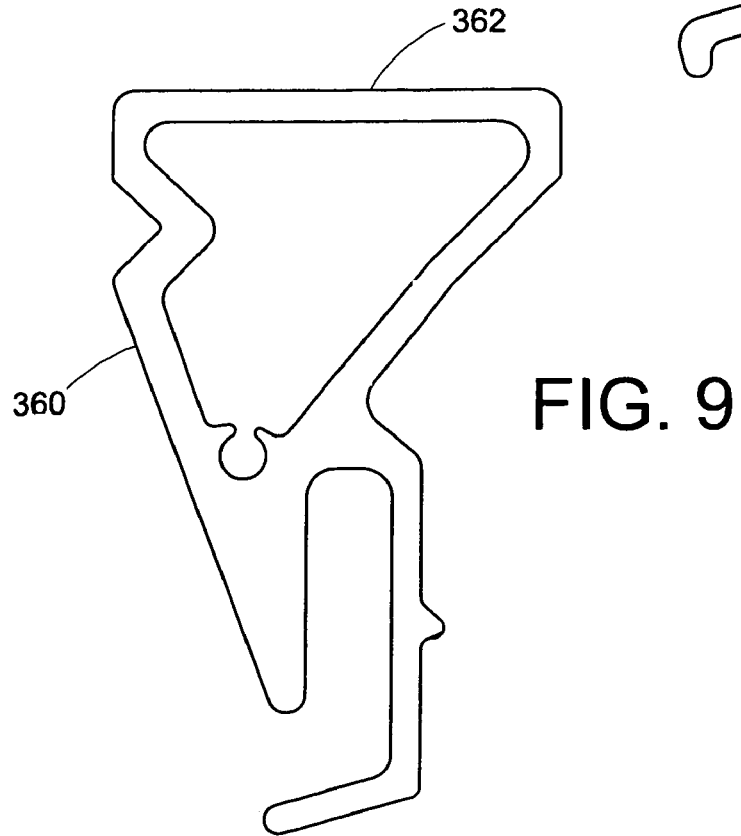
FIG. 9 is a further embodiment of the tie down system according to the invention.
Figure 10A:
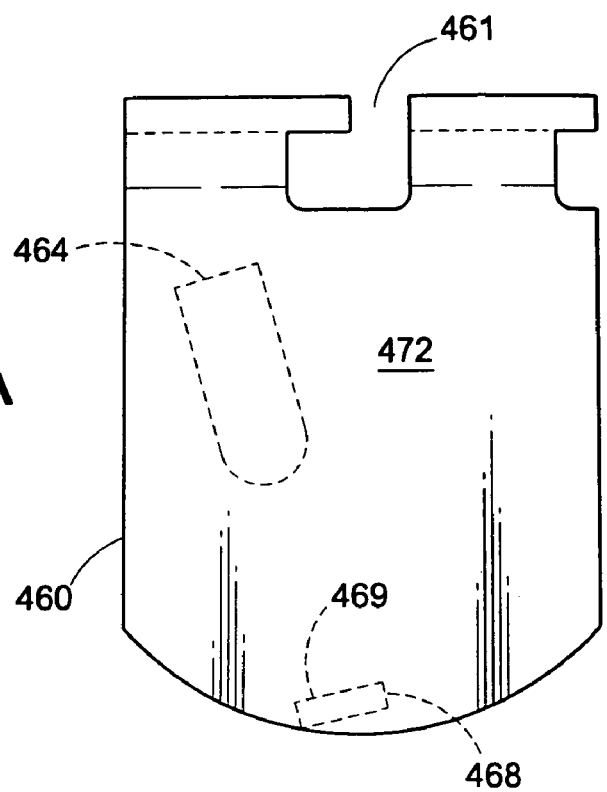
FIGS. 10A and 10B are side and front view of a further embodiment of the tie down coupling system according to the invention.
Figure 10B:
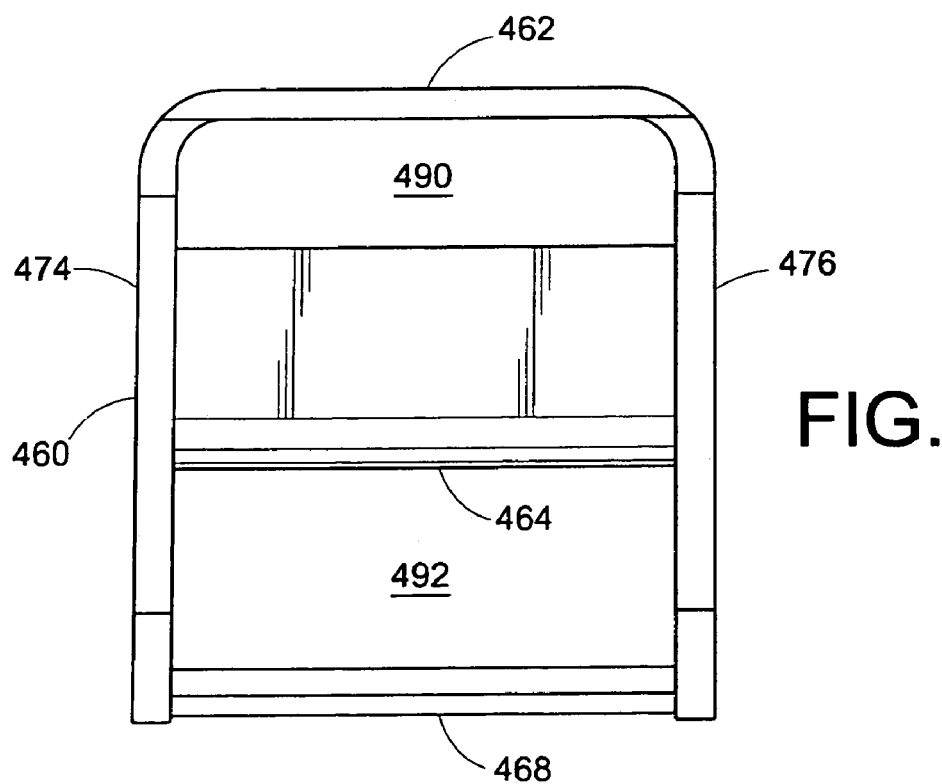

Other embodiments of the hook hanger of the present invention are possible as would be appreciated by one of ordinary skill in the art. FIGS. 8-10 illustrate possible alternative embodiments of the tie down coupling system according to the invention. In FIG. 8, the hook hanger 260 has a mounting bracket profile 262 conforming to a double-L type mounting track 238. Hook hanger 260 may be similar to the previous embodiments in other respects. FIG. 9 illustrates an alternative embodiment showing hook hanger 360 having a mounting bracket profile 362 conforming to a C-channel type mounting track. FIGS. 10A and 10B illustrate an alternative embodiment as hook hanger 462. In the embodiment shown in FIG. 10A, hook hanger 462 includes a mounting bracket profile 461 conforming to a double-L type mounting track. Hook hanger 462 also includes hook anchor 464, constructed from bar stock and connected at either end to leg members 474 and 476. Leg members 474 and 476 form substantially parallel planes on either end of hook anchor 464. Also included in hook hanger 462 is vertical-movement retainer 468. Vertical-movement retainer 468 is constructed from bar stock and is positioned with each end connected to leg member 474 and 476 respectively. Hook anchor 464 may be offset at an angle from a horizontal axis of hook hanger 462 to better accommodate a hook under tension securing a load on a truck. Leg members 474 and 476 function both as a frame to support hook anchor 464 and together as a horizontal-movement retainer to prevent substantial horizontal movement of a hook with respect to hook anchor 464. Vertical-movement retainer 468 includes surface 469 which functions to block substantial vertical movement of a hook with respect to hook anchor 464. Hook anchor 464 and vertical-movement retainer 468 are positioned such that sufficient clearance is provided to allow easy accessibility of a hook to hook anchor 464, and easy manual insertion and removal of a hook from hook anchor 464 upon appropriate manipulation of the hook. Other profiles are possible as would be appreciated by one of ordinary skill in the art.

Although several specific embodiments of the invention have been described herein, various modifications or variations will be apparent to one skilled in the art without departing from the principles and teachings herein. Accordingly, the invention is not to be limited to the specific embodiments illustrated, but is only intended to be limited by the scope of the appended claims.

The invention claimed is:

1. A hook hanger for a cargo trailer, said hook hanger comprising:

a body comprising: (i) a mounting bracket conforming in shape to and slidably engageable with an associated sliding track of an associated cargo trailer; (ii) a hook anchor connected to said mounting bracket and adapted to be engaged by an associated hook of a cargo-retaining strap or member; and, (iii) a wall spaced from said hook anchor and comprising a bottom portion adapted to capture the associated hook vertically to the hook hanger to prevent complete disengagement of the associated hook from the hook hanger by only vertical movement of the associated hook, said wall cooperating with said hook anchor to define a channel between said wall and said hook anchor, wherein said channel includes a first opening in a first lateral side of said body and the associated hook is completely disengageable from the hook anchor only by lateral sliding movement of the associated hook in the channel transverse to vertical through said channel first opening in the first lateral side of the body.

2. The hook hanger for a cargo trailer as set forth in claim 1, wherein said channel first opening in the first lateral side of the body is selectively blocked by a first movable leg member connected to said body.

3. The hook hanger for a cargo trailer as set forth in claim 2, wherein said movable leg member is pivotally connected to said body.

4. The hook hanger for a cargo trailer as set forth in claim 1, wherein said channel extends completely through said body and further comprises a second opening in a second lateral side of said body opposite said first lateral side of said body, and the associated hook is completely disengageable from the hook anchor only by lateral sliding movement of the associated hook in the channel transverse to vertical through said channel first opening in the first lateral side of the body or through said channel second opening in the second lateral side of the body.

5. The hook hanger for a cargo trailer as set forth in claim 4, wherein said channel first opening in the first lateral side of the body is selectively blocked by a first movable leg member connected to said body, and wherein said channel second opening in the second lateral side of the body is selectively blocked by a second movable leg member connected to said body.

* * * * *